(12) United States Patent
Gustafsson et al.

(10) Patent No.: US 9,975,503 B2
(45) Date of Patent: May 22, 2018

(54) COMMUNICATION BUS FOR MOTOR VEHICLE

(71) Applicant: SCANIA CV AB, Södertälje (SE)

(72) Inventors: Sune Gustafsson, Nacka (SE); Jörgen Sundberg, Enköping (SE); Thomas Lundqvist, Skogås (SE)

(73) Assignee: SCANIA CV AB (SE)

( * ) Notice: Subject to any disclaimer, the term of this patent is extended or adjusted under 35 U.S.C. 154(b) by 113 days.

(21) Appl. No.: 15/030,440

(22) PCT Filed: Oct. 7, 2014

(86) PCT No.: PCT/SE2014/051173
§ 371 (c)(1),
(2) Date: Apr. 19, 2016

(87) PCT Pub. No.: WO2015/060765
PCT Pub. Date: Apr. 30, 2015

(65) Prior Publication Data
US 2016/0272131 A1 Sep. 22, 2016

(30) Foreign Application Priority Data
Oct. 24, 2013 (SE) ...................................... 1351263

(51) Int. Cl.
*B60L 1/00* (2006.01)
*B60R 16/023* (2006.01)
(Continued)

(52) U.S. Cl.
CPC ........ *B60R 16/0238* (2013.01); *B60R 16/023* (2013.01); *H04L 25/0278* (2013.01); *H04L 2012/40273* (2013.01)

(58) Field of Classification Search
CPC .................................................. B60R 16/0238
See application file for complete search history.

(56) References Cited

U.S. PATENT DOCUMENTS

| 5,432,817 A | 7/1995 | Hormel et al. |
| 5,513,218 A | 4/1996 | Moller |

(Continued)

FOREIGN PATENT DOCUMENTS

| CN | 202796171 | 3/2013 |
| EP | 0 443 778 A2 | 8/1991 |

(Continued)

OTHER PUBLICATIONS

Office Action dated Jun. 9, 2017 in corresponding Korean Patent Application No. 10-2016-7011402 (with English language translation)(total 10 pages).

(Continued)

*Primary Examiner* — Daniel Puentes
(74) *Attorney, Agent, or Firm* — Ostrolenk Faber LLP

(57) ABSTRACT

A communication bus (B1, B2, Bp) in a motor vehicle (110) transfers electrical signals between the nodes ($N_1$, $N_2$, $N_3$, $N_n$, $N_{21}$, $N_{2m}$, $N_{p1}$, $N_{pr}$) included in the motor vehicle. The communication bus comprises two unshielded signal lines (S1, S2) and a decoupling line (D), which are configured so as to divert undesired electromagnetic radiation deriving both from external systems that are not connected to the communication bus (B1, B2, Bp) and the electrical signals transferred via the unshielded signal lines (S1, S2). The decoupling line (D) is connected for alternating current to a ground potential in one and only one ($N_3$) of the nodes ($N_1$, $N_2$, $N_3$, $N_n$, $N_{21}$, $N_{2m}$, $N_{p1}$, $N_{pr}$) included in the communication system.

8 Claims, 1 Drawing Sheet

(51) Int. Cl.
*H04L 25/02* (2006.01)
*H04L 12/40* (2006.01)

(56) References Cited

U.S. PATENT DOCUMENTS

| | | | |
|---|---|---|---|
| 6,031,823 A | 2/2000 | Hormel et al. | |
| 2007/0252659 A1* | 11/2007 | Suenaga | H01F 17/0013 333/32 |
| 2008/0204172 A1 | 8/2008 | Sakai et al. | |

FOREIGN PATENT DOCUMENTS

| | | |
|---|---|---|
| JP | 2004-335425 A | 11/2004 |
| JP | 2009-261039 A | 11/2009 |
| KR | 10-1082338 B1 | 11/2011 |
| WO | WO 2004/072854 A1 | 8/2004 |
| WO | WO 2013/132980 A1 | 9/2013 |

OTHER PUBLICATIONS

International Search Report dated Feb. 18, 2015 issued in corresponding International patent application No. PCT/SE2014/051173.

* cited by examiner

COMMUNICATION BUS FOR MOTOR VEHICLE

CROSS-REFERENCE TO RELATED APPLICATIONS

The present application is a 35 U.S.C. §§ 371 national phase conversion of PCT/SE2014/051173, filed Oct. 7, 2014, which claims priority of Swedish Patent Application No. 1351263-7, filed Oct. 24, 2013, the contents of which are incorporated by reference herein. The PCT International Application was published in the English language.

BACKGROUND OF THE INVENTION AND PRIOR ART

The present invention concerns communication in a motor vehicle. In particular, the invention concerns a communication system including nodes in a bus and a motor vehicle having the communication bus.

In modern motor vehicles, information exchange between units and the control of various functions usually is performed with the help of communication buses. Naturally it is important that the signals transferred via the communication buses not be distorted during the transfer, as this could put the function and safety of the vehicle at risk. It is also important that a communication bus not radiate or leak electromagnetic energy in some other way in a manner such that other units in or outside of the vehicle are at risk of being disrupted or knocked out entirely. Various examples of solutions for mitigating this type of problem currently exist.

For example, U.S. Pat. No. 5,513,218 describes a serial communication bus in a motor vehicle, wherein a compensation circuit prevents the occurrence of mismatches that would otherwise potentially risk distorting signal pulses in the bus and cause undesirable radiation from it. The compensation bus includes an integrator, which simulates the ground voltage when the line ground voltage exceeds the voltage of the transmitting node. Said transmitting node is deactivated between the signal pulses in order to prevent the line voltage from increasing further. If, however, the voltage of the transmitting node falls below the line ground voltage, the transmitting node will remain active, including between the signal pulses, so as to increase the potential of the line ground voltage.

U.S. Pat. No. 6,031,823 describes a vehicle communication network that includes a circuit for ground translation and is intended to provide an interface with transmitter circuits in order to achieve smooth transitions. A communication bus is here adapted so as to be connected to a plurality of transceivers, wherein each transceiver is connected via a resistive element and supplies current to the bus when the transmitter voltage exceeds the bus voltage. The resistance thus added reduces the current changes that would otherwise occur in the bus when current sources are turned off and on.

The prior art also includes surrounding the signal cables in a communication bus with shielding that is in turn grounded for direct current in one of the network nodes while the shielding in all other nodes is grounded for alternating current only. This makes it possible to limit the undesired radiation of electromagnetic energy from the signal cables very effectively.

Problems Associated with the Prior Art

The latter strategy is, however, both expensive and technically complex to implement in a vehicular environment, since the communication bus there will often have relatively numerous connection points to the bus, and the shielding must be kept intact past all said connection points.

SUMMARY OF THE INVENTION

The object of the present invention is consequently to provide a solution to the foregoing problem and offer a simple and cost-effective means of communicating via a bus in a motor vehicle without the risk of undesirable effects on other units inside the host vehicle or outside the vehicle as a result of leaking electromagnetic radiation.

According to one aspect of the invention, this object is achieved by means of the aforedescribed communication bus, wherein the decoupling line is connected for alternating current to a ground potential in one and only one of the nodes included in the communication system.

This communication bus is advantageous, since it has been shown to provide shielding of the signal lines corresponding to that achieved had they been surrounded by a conventional shield, even if, for example, the decoupling line consists only of a single wire twisted around the signal lines.

According to one embodiment of this aspect of the invention, the decoupling line is connected for alternating current to the ground potential in the node that is, geometrically speaking, the most centrally located of the nodes included in the communication system. The most efficient possible reduction of electromagnetic radiation from the communication bus is achieved thereby.

According to another embodiment of this aspect of the invention, the unshielded signal lines are connected for alternating current to a ground potential in each and every one of the nodes. This namely provides effective balancing, while the grounding with respect to direct current is unaffected.

According to yet another embodiment of this aspect of the invention, the unshielded signal lines are twisted together with one another, e.g. in the form of a twisted two-wire conductor. This also provides for cost-effective and simple implementation. The decoupling line is further suitably twisted together with the signal lines.

According to another aspect of the invention, the object is achieved by means of the aforedescribed motor vehicle, wherein the communication link in the motor vehicle comprises the proposed communication bus. The advantages of the motor vehicle, as well as the preferred embodiments thereof, are presented in the discussion above with reference to the proposed communication bus.

BRIEF DESCRIPTION OF THE DRAWINGS

The present invention will now be explained in detail by means of embodiments, which are described as examples, and with reference to the accompanying drawings.

DESCRIPTION OF EMBODIMENTS OF THE INVENTION

Figure 1:
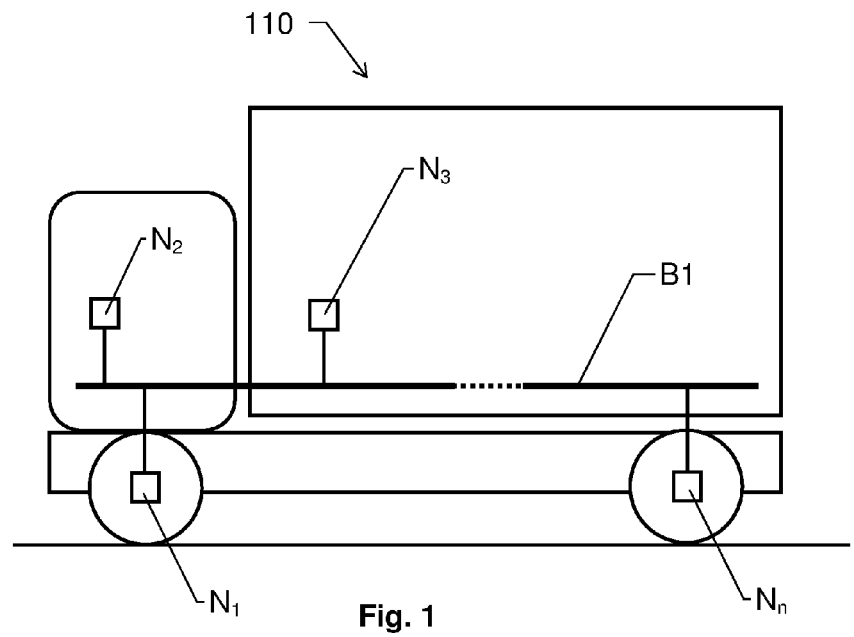
FIG. 1 shows a schematic depiction of a motor vehicle that contains a communication bus according to a first embodiment of the invention.
Figure 2:
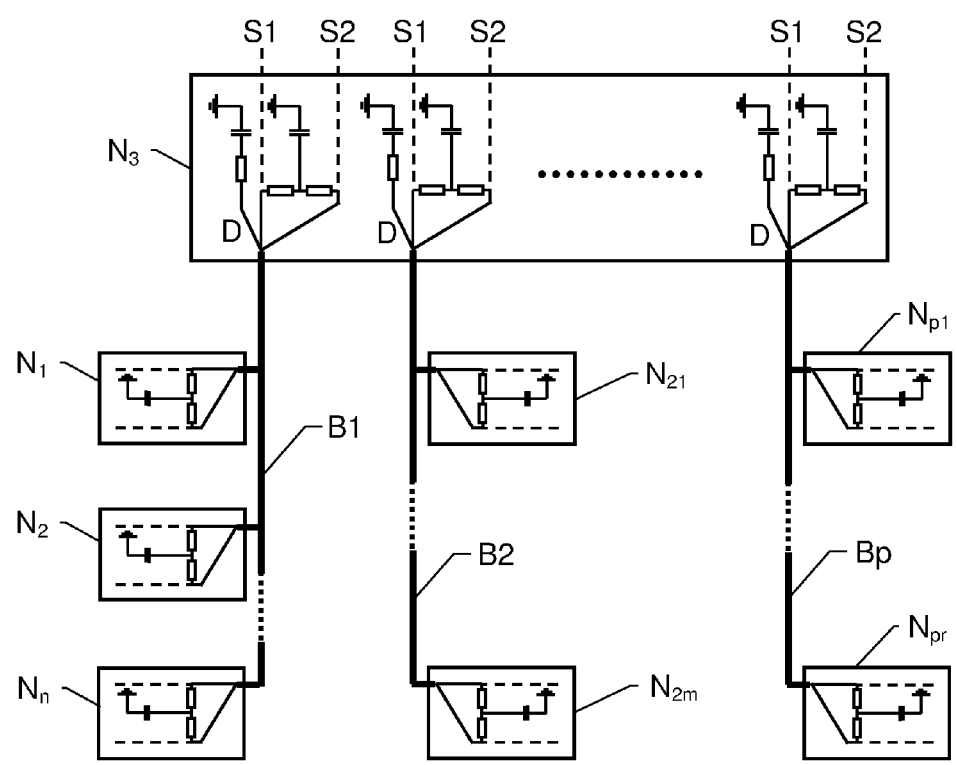
FIG. 2 shows a number of communication buses that are coupled together according to one embodiment of the invention.

FIG. 1 shows a schematic depiction of a motor vehicle 110 containing a first communication bus B1 according to a first embodiment of the invention. FIG. 2 additionally shows a number of communication buses B2, . . . , Bp, which are coupled together with the first communication bus B1 according to one embodiment of the invention. The communication buses B1, B2, . . . , Bp can, for example, be arranged so as to transfer signals of the CAN type (CAN=Controller Area Network).

In any event, the communication bus B1 is configured so as to transfer electrical signals between a number of nodes, here $N_1$, $N_2$, $N_3$, . . . , $N_n$, which are included in a communication system in the motor vehicle 110. The communication bus B1 in turn comprises two unshielded signal lines S1 and S2 and decoupling line D. Given that the communication bus B1 is of the CAN type, a first signal wire S1 can constitute a so-called CAN-high line and a second signal wire S2 can constitute a so-called CAN-low line.

The unshielded signal lines S1 and S2 are configured so as to transfer information between the nodes $N_1$, $N_2$, . . . , $N_n$ with the help of a differential (balanced) signal. The decoupling line D is configured so as to divert undesired electromagnetic radiation. Such radiation can derive both from the unshielded signal lines S1 and S2 and from external systems, i.e. signal sources that are not connected to the communication bus B1.

According to the invention, the decoupling line D is connected for alternating current to a ground potential in one and only one of the nodes included in the communication system, let us say node $N_3$. This means that the unshielded signal lines S1 and S2 will achieve a good balance to ground (so-called common mode rejection), and that any disturbances will be efficiently conducted away to ground. FIG. 2 illustrates the alternating current ground connection of the decoupling line D with a schematic resistor and a schematic capacitance between the decoupling line D and ground. In an actual implementation the resistance and capacitance will be chosen so that good matching with the impedance characteristics of the communication buses B1, B2 and Bp is achieved.

For cost reasons, and with a view to achieving a simple design for the communication bus and its connections, the decoupling line D is advantageously unshielded, as is represented by, for example, a single insulated cable.

According to one preferred embodiment of the invention, the decoupling line D is connected for alternating current to the ground potential solely in the node, here $N_3$, that is, geometrically speaking, the most centrally located of the nodes included in the communication system, i.e. of the nodes $N_1$, $N_2$, $N_3$, . . . , $N_n$ in FIG. 1 and $N_1$, $N_2$, $N_3$, . . . , $N_{21}$, . . . , $N_{2m}$, $N_{p1}$, . . . , $N_{pr}$ in FIG. 2. Such a ground condition has namely been found to provide the very best balance to ground, and thus the most effective suppression of disturbances. Because it can be difficult to predict just how a given motor vehicle 110 may be configured during its manufacture and/or modified after delivery, it is advantageous for more than one node, and preferably all the nodes, to be prepared for alternating current-connection of the decoupling line D to the ground potential. The ground connection point can thus be tracked and moved depending on what proves to constitute, respectively become, the most central position in the vehicle communication system geometrically speaking.

Each and every one of the unshielded signal lines S1 and S2 is suitably connected for alternating current to the ground potential in each of the nodes $N_1$, $N_2$, $N_3$, . . . , $N_n$, $N_{21}$, . . . , $N_{2m}$ or respectively $N_{p1}$, . . . , $N_{pr}$. This is illustrated in FIG. 2 by schematic resistances and capacitances between the signal line and ground.

It is also advantageous for the unshielded signal lines S1 and S2 to be twisted together with one another. They can thus constitute a twisted-pair wire cable. According to one preferred embodiment of the invention, the decoupling line D is also twisted together with the signal lines S1 and S2. The communication bus B1, B2 and/or Bp can thus be represented by a twisted three-wire cable.

The invention is not limited to the embodiments described with reference to the figures, but can be varied freely within the scope of the accompanying claims.

The invention claimed is:

1. A communication system in a motor vehicle, comprising:
   a plurality of nodes in the communication system;
   at least one communication bus for the motor vehicle, wherein
   each communication bus is configured to transfer electrical signals between at least two of the nodes included in the communication system in the vehicle;
   each communication bus comprises two unshielded signal lines and a decoupling line, the decoupling line being configured to divert undesired electromagnetic radiation deriving from at least one external system that is not connected to the communication bus or from electrical signals transferred via the unshielded signal lines; and
   the decoupling line is connected for alternating current to a ground potential in only one of the nodes included in the communication system.

2. The communication system according to claim 1, wherein the node in which the decoupling line is connected for alternating current to the ground potential is the node that is connected to each of the at least one communication bus in the communication system.

3. The communication system according to claim 1, wherein the unshielded signal lines are connected for alternating current to a ground potential in each of the nodes.

4. The communication system according to claim 1, wherein the decoupling line is unshielded.

5. The communication system according to claim 1, wherein the unshielded signal lines are twisted together with one another.

6. The communication system according to claim 4, wherein the decoupling line is twisted together with the unshielded signal lines.

7. The communication system according to claim 5, wherein the decoupling line is twisted together with the unshielded signal lines.

8. A motor vehicle containing:
   a communication system in a motor vehicle, comprising:
   a plurality of nodes in the communication system;
   at least one communication bus for the motor vehicle, wherein
   each communication bus is configured to transfer electrical signals between at least two of the nodes included in the communication system in the vehicle;
   each communication bus comprises two unshielded signal lines and a decoupling line, the decoupling line being configured to divert undesired electromagnetic radiation deriving from at least one external system that is not connected to the communication bus or from electrical signals transferred via the unshielded signal lines; and
   the decoupling line is connected for alternating current to a ground potential in only one of the nodes included in the communication system; and a communication link configured to enable information exchange between the nodes included in the communication system, the communication link comprises the comprising the at least one communication bus.

* * * * *